April 14, 1936. L. CAMMEN 2,037,365

METHOD AND MEANS FOR DETERMINING THE LUBRICATING QUALITIES OF LIQUIDS

Filed Aug. 18, 1933

Inventor
Leon Cammen
By Joseph H. Lipschutz
Attorney

Patented Apr. 14, 1936

2,037,365

UNITED STATES PATENT OFFICE 2,037,365

METHOD AND MEANS FOR DETERMINING THE LUBRICATING QUALITIES OF LIQUIDS

Leon Cammen, New York, N. Y.

Application August 18, 1933, Serial No. 685,712

3 Claims. (Cl. 73—51)

This invention relates to a method of, and apparatus for, determining the lubricating qualities of liquids. The general principle involved in this invention is the same as disclosed in my co-pending application Serial No. 606,335 filed April 20, 1932. As set forth in said co-pending application, this principle consists in determining the adsorptive qualities of liquids as a measure of their lubricating ability. Several methods of determining the adsorptive qualities of liquids are disclosed in the said co-pending application, and in the present application I disclose a further method and means for determining adsorptiveness.

Further objects and advantages of this invention will become apparent in the following detailed description thereof.

In the accompanying drawing.

Figure 1:
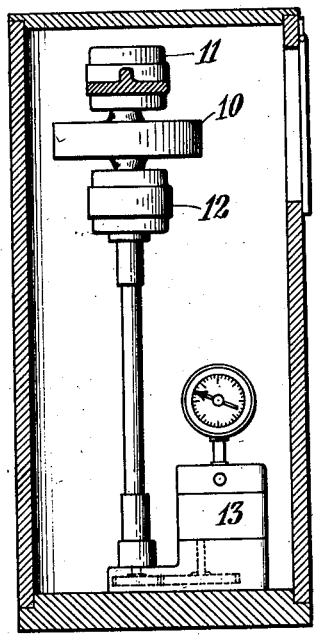
Fig. 1 is a front elevation, partly sectioned vertically, disclosing the mechanism employed herein for determining adsorption.
Figure 2:
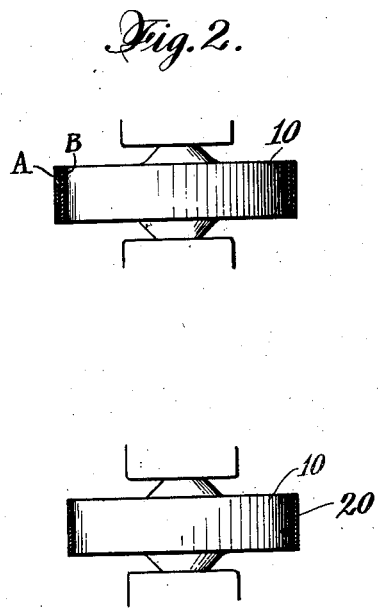
Fig. 2 is a view of the rotor of the Fig. 1 device with diagrammatic representation illustrating the theory underlying this invention.

Reviewing the theory underlying my invention, reference may be had to Fig. 2 wherein it is disclosed that when lubricant is applied to a metal there are in reality two distinct conditions existing within said lubricant. In that portion of the lubricant indicated by the letter A, the particles of lubricant are in cohesive relation to one another but not to the metal. In that portion of the oil layer indicated by the letter B the particles are held in adsorptive relation to the metal. The adsorptive attachment between the surface of the metal and the particles of oil is probably due to the existence of a field of force about the metal which causes the molecules of the lubricant to adhere thereto.

The ability of an oil to lubricate is determined by the adsorptive qualities of the oil, that is, its ability to stick to the metal. The adsorptive power of a lubricant, i. e., the attachment of the oil to the metal, and not its viscosity, i. e., the cohesion between the particles of oil, determines its lubricating value.

In my said co-pending application, Serial No. 606,335, I disclosed a method of determining the adsorptive qualities of a lubricant. As stated therein, I make use of the fact that the adsorptively held particles of the lubricant upon the outer surface of a rapidly spinning metallic member will resist being thrown off the surface to a much greater degree than will the viscously held particles. In the said co-pending application I disclosed a method of determining the adsorptive qualities of an oil by determining the speed of rotation (and, hence, the centrifugal force) necessary to detach the oil particles from the periphery of a rotor. I further disclosed a method of determining adsorption by measuring the thickness of the oil film before and after centrifuging.

In the present case I disclose still another method of determining adsorption, which method was suggested in my said co-pending application, namely, weighing. This method may be described as follows: The oil to be tested is applied to the periphery of a rotor 10, said rotor being supported in bearings 11 and 12 and rotated by means of a motor 13 capable of rotating said rotor at high speeds. The rotor 10 is weighed after the lubricant is applied thereto and before it is centrifuged. It is then centrifuged at a predetermined speed on the order of several thousand revolutions per minute, and is then re-weighed to determine the amount of oil which adheres to the rotor after centrifuging.

Figure 3:
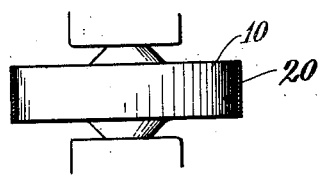
Fig. 3 is a detail showing a modification of the rotor construction of the Fig. 1 device.

In a modified form of the invention disclosed in Fig. 3, I may provide a removable rim 20 in the form of a band adapted to be slipped over the periphery of the rotor 10 and adapted to have the oil to be investigated applied to the outer surface of the band instead of directly to the rotor surface.

If a very thin film is applied to the rotor surface or the surface of band 20, all of the lubricant will be adsorptively held by the metal surface. If, however, more oil is applied than can be adsorptively held by the metal surface, then certain of said oil will be viscously held, in other words, in addition to the film B which is in adsorptive relation to the rotor surface, there will be particles of oil in the film A which are merely cohesively held, that is, viscously held. It will be seen that if there is any viscously held oil A on the rotor at the beginning of test, an error will be introduced since it is the primary purpose of the invention to determine how much of the adsorptively held oil B is thrown off at a predetermined speed, and if there is any viscously held oil at the beginning of test no true indication can be had because in addition to a portion of the adsorptively held oil all of the viscously held oil will be thrown off.

In order, therefore, to make certain that the test applies only to the adsorptively held oil a method of operation may be employed which consists first in spinning the rotor up to a relatively low speed, such as, for example, 1,000 R. P. M., which is sufficient to throw off the viscously held oil. The rotor is then weighed and this weight will give the weight of rotor plus adsorptively held oil. The rotor is then spun up to a high speed far in excess of the 1,000 R. P. M., said speed being in the range of 5,000 to 20,000 R. P. M., and, after centrifuging, the rotor is again weighed so that the amount of adsorptively held oil which has been thrown off may be determined by subtraction. As stated above, the necessity for this method can be avoided by applying such a thin film of oil that all of the oil will be adsorptively held in the first place.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of determining the adsorption of a liquid by a metal which consists in applying the liquid to the periphery of a rotor, centrifuging, and weighing said rotor and the fluid thereon before and after centrifuging.

2. The method of determining the adsorption of a liquid by a metal which consists in applying said liquid to a rotor, rotating said rotor at a relatively low speed not less than that sufficient to throw off cohesively held liquid, weighing the rotor and liquid remaining thereon after rotating, rotating said rotor at predetermined higher speed, and weighing said rotor and liquid remaining thereon after said second rotation.

3. An apparatus for determining the adsorptive quality of a liquid comprising a rotor and means for rotating said rotor, said rotor having a removable rim upon the outer peripheral surface of which the liquid under test is applied.

LEON CAMMEN.